No. 862,043. PATENTED JULY 30, 1907.
W. M. AKERS.
CEMENT BLOCK MOLDING MACHINE.
APPLICATION FILED APR. 11, 1906.
3 SHEETS—SHEET 1.
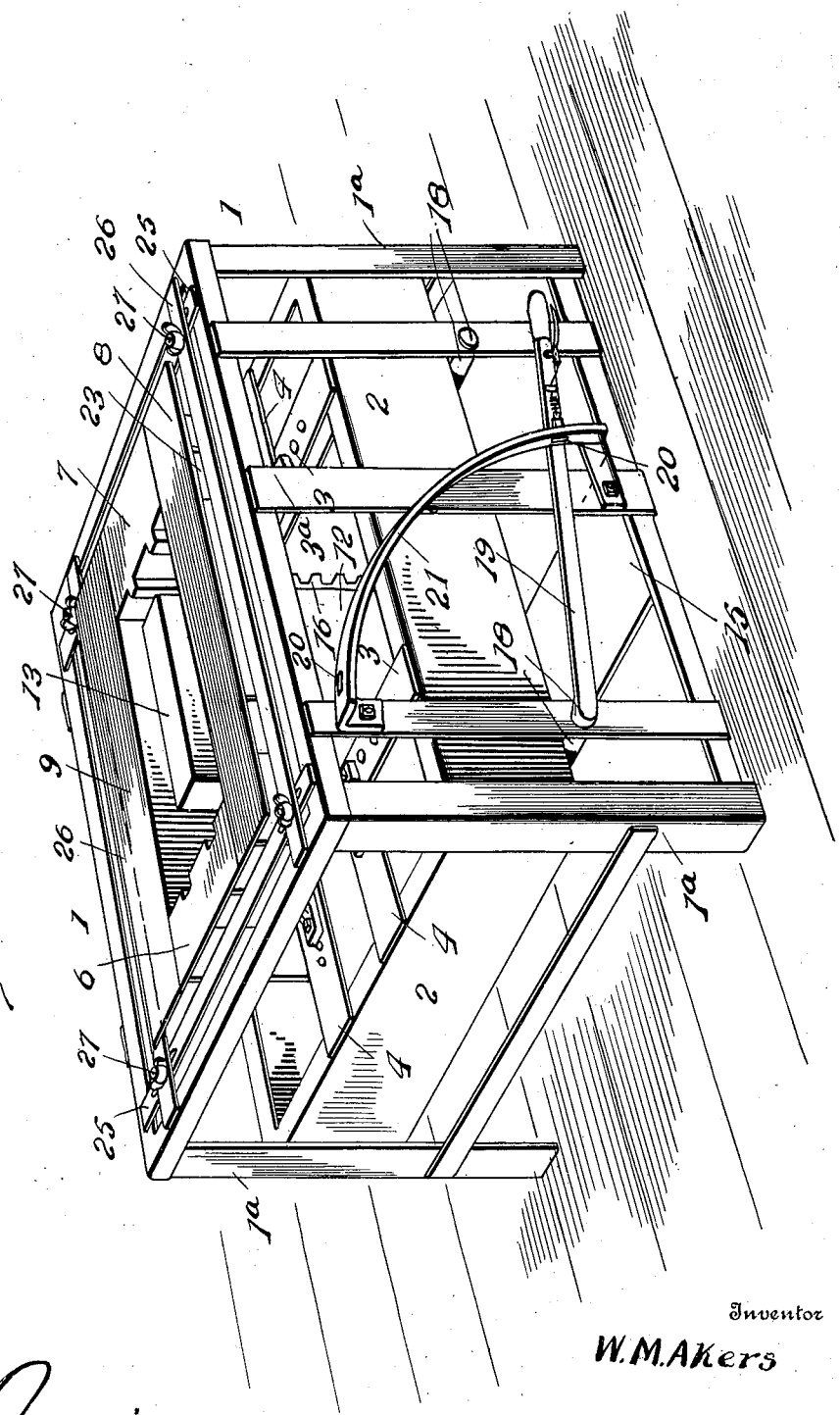
Fig. 1.
Witnesses
Inventor
W. M. Akers
By Attorneys No. 862,043. PATENTED JULY 30, 1907.
W. M. AKERS.
CEMENT BLOCK MOLDING MACHINE.
APPLICATION FILED APR. 11, 1906.
3 SHEETS—SHEET 2.
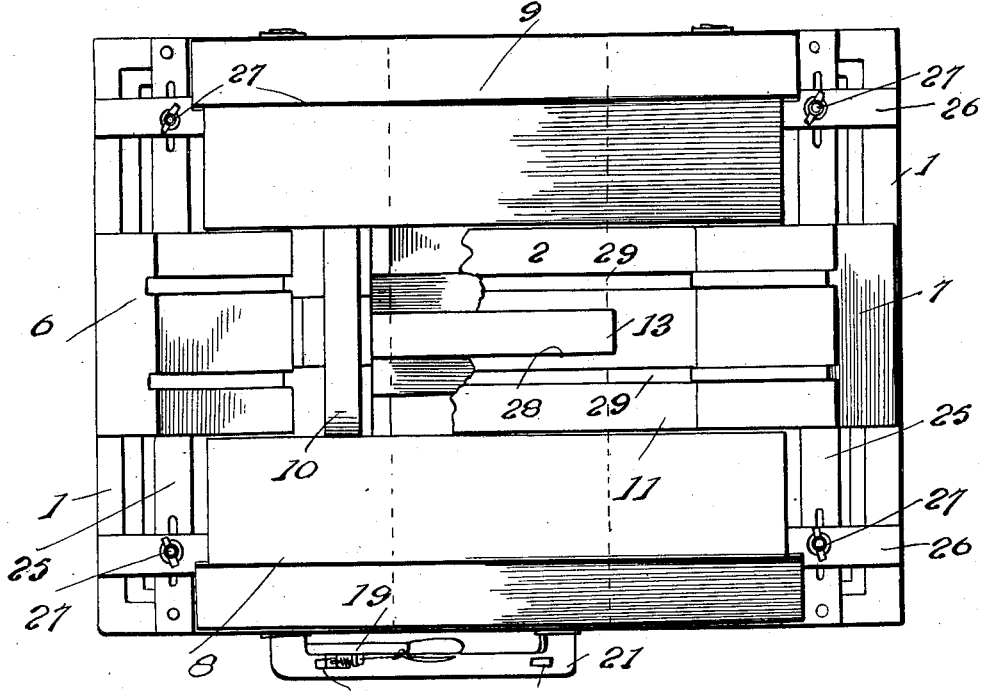
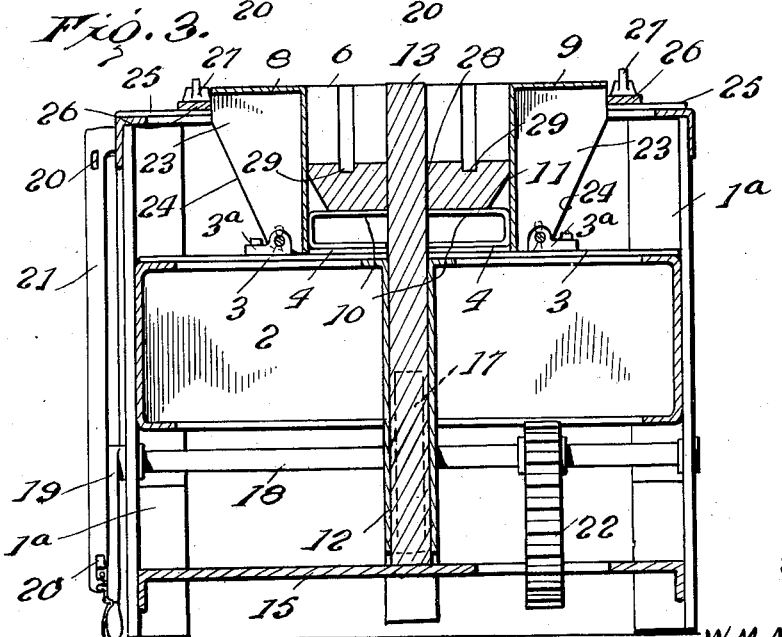
Inventor
W. M. Akers

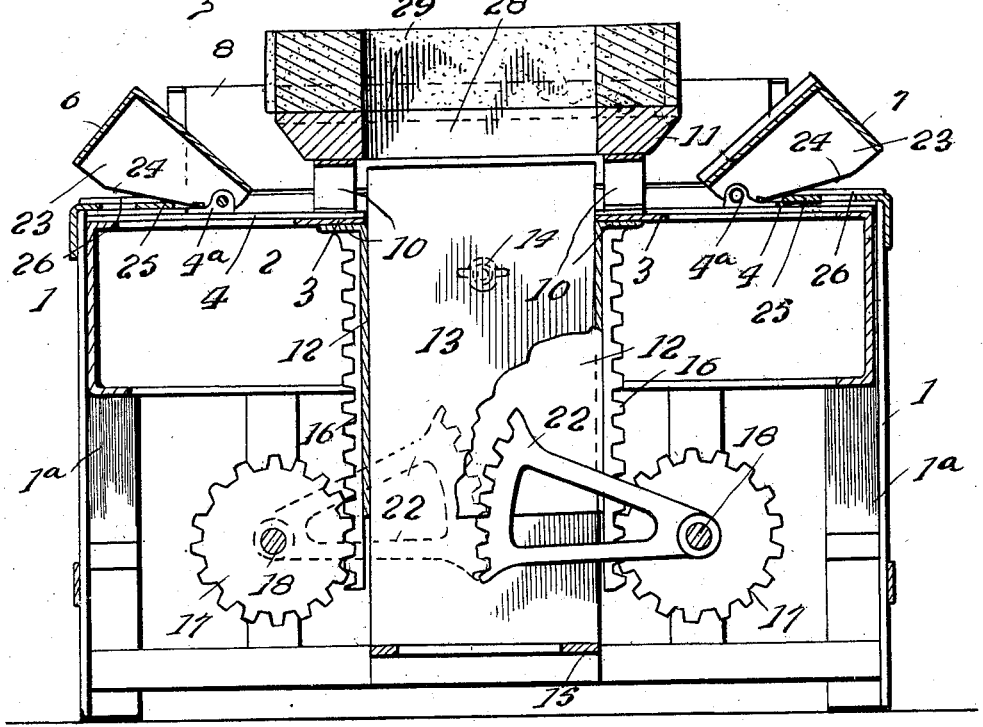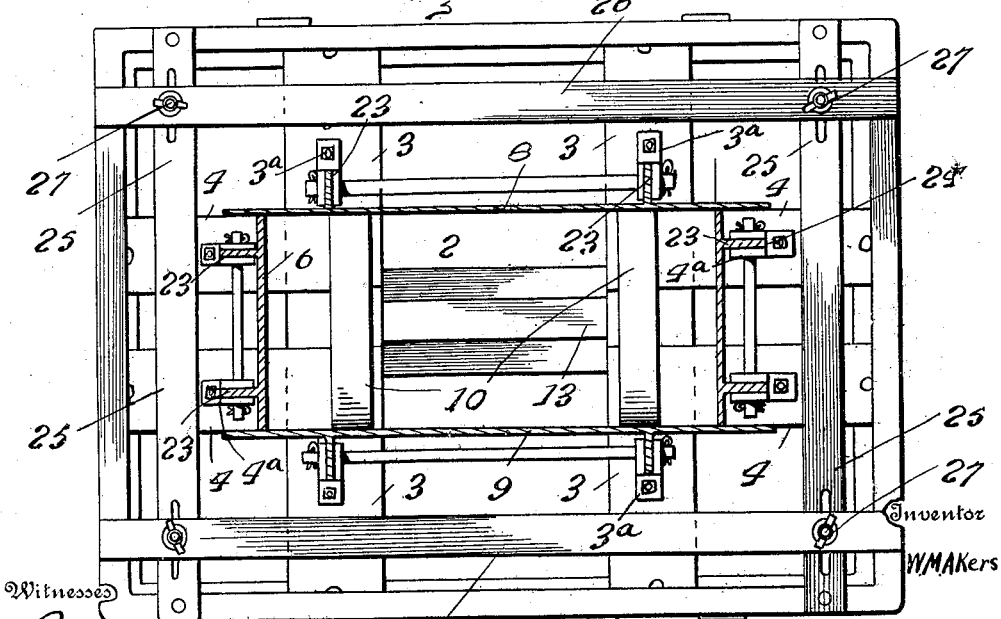

UNITED STATES PATENT OFFICE.

WILLIAM M. AKERS, OF DECATUR, IOWA, ASSIGNOR OF ONE-HALF TO E. W. TOWNSEND, OF DECATUR, IOWA.

CEMENT-BLOCK-MOLDING MACHINE.

No. 862,043.   Specification of Letters Patent.   Patented July 30, 1907.

Application filed April 11, 1906. Serial No. 311,152.

*To all whom it may concern:*

Be it known that I, WILLIAM M. AKERS, a citizen of the United States, residing at Decatur, in the county of Decatur and State of Iowa, have invented certain new and useful Improvements in Cement-Block-Molding Machines, of which the following is a specification.

For a full description of the invention and the merits thereof and also to acquire a knowledge of the details of construction of the means for effecting the result, reference is to be had to the following description and accompanying drawings, in which:

Figure 1 is a perspective view of my improved molding machine. Fig. 2 is a top plan view thereof with the mold members in open position. Fig. 3 is a transverse sectional view with the mold closed. Fig. 4 is a longitudinal sectional view with the mold open and a block shown resting on the pallet. Fig. 5 is a horizontal section taken on a plane extending through the mold members.

Corresponding and like parts are referred to in the following description and indicated in all the views of the drawings by the same reference characters.

The frame work 1 of my improved cement block molding machine, is composed of suitable uprights or legs annular in cross section as shown and upper and lower cross bars or braces riveted or otherwise rigidly connected together. The mold carriage 2 comprises a rectangular frame with side bars and end bars mounted between the angular legs $1^a$ of the frame work and fitted at its corners to slide in said frame work and to be accurately guided thereby with an up and down motion. The carriage 2 is preferably constructed of angle beams as shown and is provided at its top with two spaced apart cross bars 3 each of which is connected to the adjacent end beam of the carriage by a pair of longitudinally extending stub bars 4. The stub bars 4, as well as each of the cross bars 3 carry shaft bearings designated $4^a$ and $3^a$ respectively, and the shaft bearings $3^a$ that are mounted on the cross bars 3 are adjustable on said cross bars in any desired manner so that each bearing at one side of the machine may be adjusted near to or farther away from the side bars of the carriage.

6 and 7 designate the end members of the mold proper, and 8 and 9 the side members respectively, of the said mold. Each of said members is attached to its respective shaft bearing by a cotter-held shaft, so that each one of the mold members may be removed whenever desired. As it is proposed to mold with this machine, cement blocks of different sizes, this detachable feature of the mold members is provided. By this arrangement the said mold members 8 and 9 may be adjusted towards each other through the instrumentality of the shaft bearings $3^a$, and the end members 6 and 7 may be removed and replaced by other members of less width or greater width according to the adjustment of the side members of the mold.

The cross bars 3 are provided at their middle portions at the ends of the stub bars 4 with frames 10 preferably riveted thereto or otherwise fixedly held thereon, said frames being designed to support a pallet 11. Between the cross bars 3 and their frames 10 there is secured a depending guide head 12 designed to receive a core 13. The core 13 may be detached whenever desired by the set screw 14, and it is preferably stationary when in operation and is directly supported upon a cross bar 15 at the bottom of the frame work 1. The guide head 12 is provided at each side with a vertically extending rack 16, and pinions 17 mesh with said racks. The pinions 17 are mounted on transverse shafts 18 journaled in the frame work 1, and one of said shafts is provided with a hand lever 19 having a detent designed for engagement with either the upper or the lower notch 20 in the quadrant 21. The shafts 18 are provided at their opposite ends with toothed segments 22 meshing together as shown, so that both shafts may be simultaneously turned by the one hand lever 19.

Each of the mold members 6, 7, 8 and 9 is preferably constructed of angle metal with upper and outwardly extending flanges and they are all hinged to one side of their center of gravity and by webs 23 having inclined outer edges 24. It will be seen therefore that the tendency of all the mold members is to swing or fall into an outwardly inclined position away from each other. To guide the mold members into the vertical position where their sides and edges will abut against each other to form the block, I have provided end guide bars 25 and side guide bars 26. The end guide bars 25 are preferably stationary and are fixedly secured at their ends to the upper side bars of the frame work 1, while the side bars 26 preferably over-lap the end guide bars 25 near the ends of the latter, and are supported thereon in an adjustable manner by means of a slot and set screw connection 27. Each of the guide bars is designed to coact with the rear or outer edges 24 of the webs 23, so that as the carriage 2 is lowered within the frame work the mold members will be tilted from their outward inclined position to said vertical position in condition to receive the plastic material. Conversely, as the carriage is raised upwardly out of the upper end of the frame work 1, the mold members will have a tendency to swing apart, the said inclined outer edges 24 of the webs riding upwardly and outwardly upon the guide bars. The guide bars 26 are made adjustable towards and from each other, to correspond to the adjustment of the said members 8 and 9 of the mold, which has been before referred to.

The pallet 11 is provided with a recess or slot 28 designed to fit the core 13 which latter will form an air space within the block, and the said pallet may be provided on its upper surface with grooves 29 designed to form locking webs on the block. The end member 6 of the mold may be provided with grooves also designed to form male locking members or tongues for one end of the block, while the complemental member 7 may be provided with tongues intended to produce locking members to receive corresponding tongues in an end of an adjacent block in the completed wall construction. The cover for the mold may be formed in any desired manner according to the configuration it is intended the upper surface of the completeed block shall have.

From the foregoing description in connection with the accompanying drawings, the operation of my improved cement block molding machine is obvious. The carriage is first lowered so that the mold members will assume their proper contacting positions. The plastic material is then poured in, and after it has set, the hand lever 19 is manipulated to raise the carriage to its upper position, which will carry the completed block up out of the mold, the pallet sliding upon the core and supporting the block, while the mold members will automatically swing apart from each other and permit of the ready removal of the block. In its uppermost position the pallet is preferably clear of the upper end of the core and is at all times directly supported by the frames 10.

Having thus described the invention, what is claimed as new is:

1. A cement block molding machine, comprising a rectangular frame work embodying legs angular in cross section and upper and lower cross bars connected to said legs, a mold carriage consisting of a rectangular frame with side bars and end bars and fitted at its corners to slide in the said frame-work and arranged to be accurately guided thereby with an up and down motion, means for raising and lowering the carriage within the frame-work, spaced cross bars 3 secured to said carriage, a pair of stub bars 4 connected to each cross bar 3 and extending therefrom to the respective ends of the carriage, two side shafts that are provided with bearings detachably mounted on the said cross bars 3 so that said shafts may be moved near to or farther away from each other, other shafts provided with bearings mounted upon the said pairs of stub bars, side mold members pivotally mounted at their lower ends upon said first named shafts, end mold members pivotally and detachably mounted upon the second named shafts, for the purpose specified, a cross bar 15 mounted within the bottom of the frame-work, a core 13 supported in a stationary manner upon said cross bar 15, a guide head secured to the carriage and surrounding said core and slidable thereon, the core assisting in guiding the carriage in the up and down motion of the latter, and pallet supporting frames 10 mounted on said carriage at the opposite side edges of the core.

2. A cement block molding machine, comprising a rectangular frame-work embodying legs angular in cross section and upper and lower cross bars connected to said legs, a mold carriage consisting of a rectangular frame with side bars and end bars and fitted at its corners to slide in the said frame-work and arranged to be accurately guided thereby with an up and down motion, means for raising and lowering the carriage within the frame-work, spaced cross bars 3 secured to said carriage, a pair of stub bars 4 connected to each cross bar 3 and extending therefrom to the respective ends of the carriage, two side shafts that are provided with bearings detachably mounted on the said cross bars 3 so that said shafts may be moved near to or farther away from each other, other shafts provided with bearings mounted upon the said pairs of stub bars, side mold members pivotally mounted at their lower ends upon said first named shafts, end mold members pivotally and detachably mounted upon the second named shafts, for the purpose specified, a cross bar 15 mounted in the bottom of the frame-work, a core supported on said cross bar, a guide head secured to the carriage and surrounding said core and slidable thereon when the carriage is moved up and down, frames 10 mounted upon the carriage at opposite side edges of the core and adapted to support a pallet, and a pallet detachably supported on said frames, the said pallet being provided with a slot to receive the core, and the proportions of the parts being such that at the upper limit of movement of the carriage the pallet may be supported by the said frames in entirely a higher plane above the upper edge of the core.

In testimony whereof I affix my signature in presence of two witnesses.

WILLIAM M. AKERS. [L. S.]

Witnesses:
CHAS. B. MILLSAY,
CHAS. FISHER.